United States Patent

[11] 3,596,726

| [72] | Inventor | Noria Takada<br>Shizuoka-ken, Japan |
|---|---|---|
| [21] | Appl. No. | 810,993 |
| [22] | Filed | Mar. 27, 1969 |
| [45] | Patented | Aug. 3, 1971 |
| [73] | Assignee | Yamaha Hatsudoki Kabushiki Kaisha<br>Shizuoka-ken, Japan |
| [32] | Priority | Mar. 30, 1968 |
| [33] | | Japan |
| [31] | | 43/20663 |

[54] ENDLESS-BELT TRACTION SNOW VEHICLE
8 Claims, 3 Drawing Figs.

[52] U.S. Cl. .................................................. 180/5, 280/21
[51] Int. Cl. ........................................... B62m 27/02
[50] Field of Search ...................................... 180/5, 6, 3, 4; 280/21

[56] References Cited
UNITED STATES PATENTS

| 1,090,052 | 3/1914 | Hallock | 280/21(.5) |
| 3,023,824 | 3/1962 | Bombardier | 180/5 X |
| 3,166,338 | 1/1965 | Romsdal | 280/21 |
| 3,213,955 | 10/1965 | Hetteen | 180/5 |
| 3,480,096 | 11/1969 | Hammitt | 180/5 |
| 3,504,752 | 4/1970 | Milward | 180/5 |

Primary Examiner—Richard J. Johnson
Attorney—Irving M. Weiner

ABSTRACT: An endless-belt traction snow vehicle has a pair of front skis for directing the course. Said skis are supported at the front bottom of the vehicle body by extensible leg members which are fixed to the vehicle body in a suitable length desired each time.

Patented Aug. 3, 1971

INVENTOR.
Norio Takada

BY Irving M. Weiner
ATTORNEY

ENDLESS-BELT TRACTION SNOW VEHICLE

BACKGROUND OF THE INVENTION

This invention relates to an endless-belt traction snow vehicle improved so as to control the amounts of load which are respectively applied or distributed to the front skis and endless-belt traction means thereof.

It has been known that the prior art endless-belt traction snow vehicle is provided with a pair of front skis for directing the course. Where the endless-belt traction snow vehicle is designed to have larger loads applied to the front skis than those generally applied, said vehicle is reduced in ascending power though improved in operability. In contact, where the vehicle is designed to have small loads applied to the front skis, said vehicle is appreciably obstructed in operability, though increased in ascending power.

SUMMARY OF THE INVENTION

An object of this invention is to provide an endless-belt traction snow vehicle so improved that said vehicle maintains a desired traction power and operability no matter whether it ascends, descends, or horizontally travels on the ground.

The endless-belt traction snow vehicle of this invention therefore comprises a vehicle body, an endless-belt traction means driving said vehicle body, a pair of skis for direction the course, vertically extensible leg members by which said skis are supported at the front bottom of the vehicle body, and means for fixing said leg members to the vehicle body in a suitable length desired each time.

DESCRIPTION OF THE PREFERRED EMBODIMENTS

Figure 1:
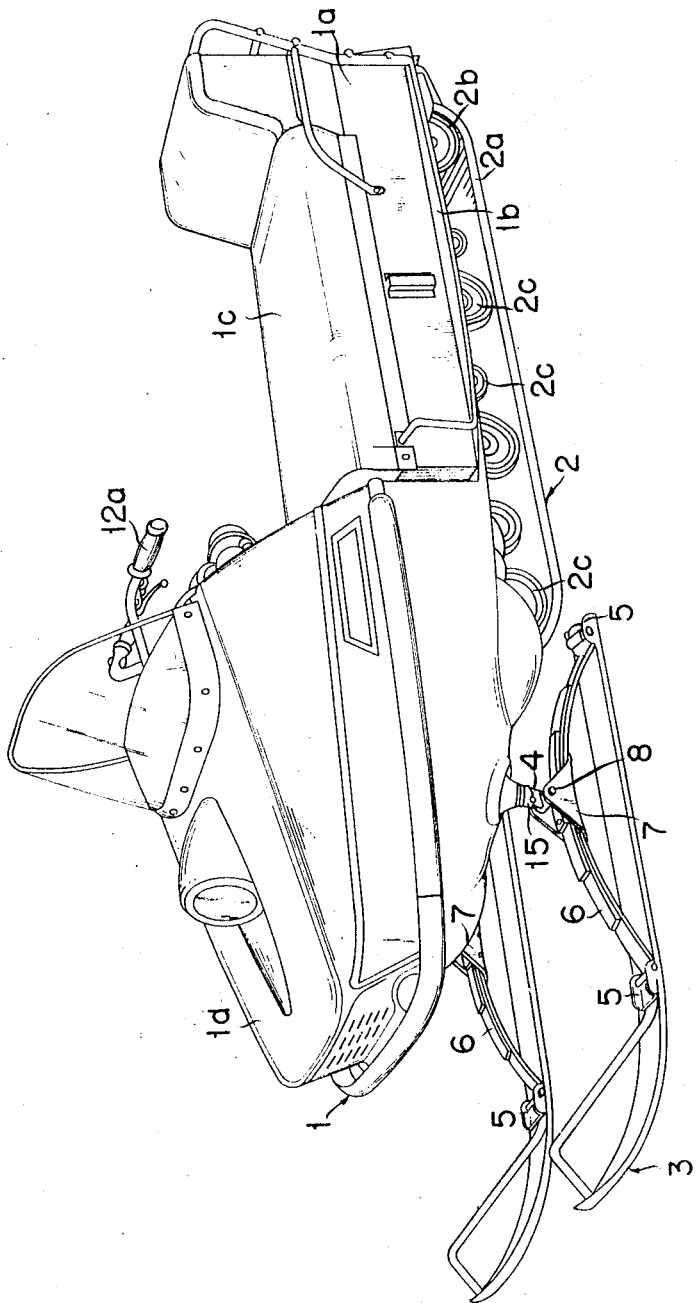
FIG. 1 is a perspective view of an endless-belt traction snow vehicle embodying the present invention.
Figure 2:
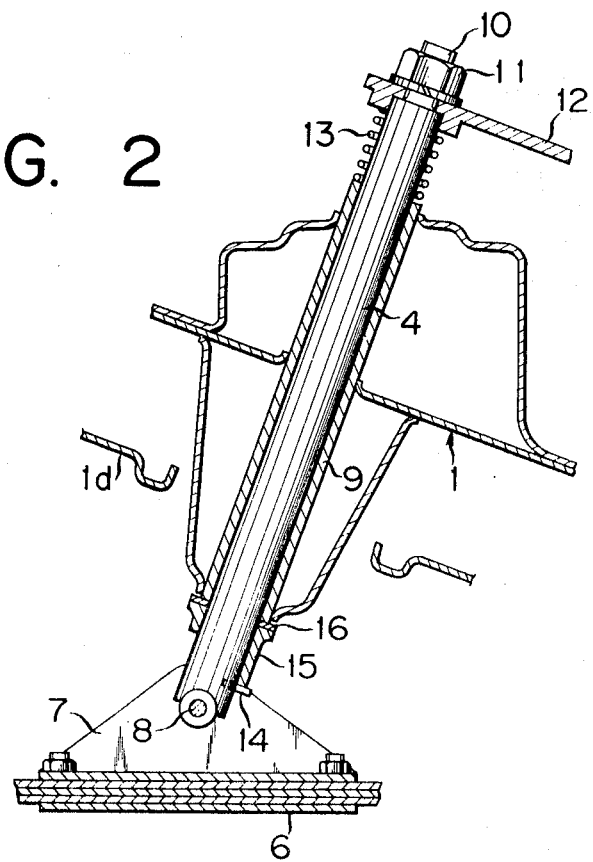
FIG. 2 is a cross-sectional view of the main part of said snow vehicle of FIG. 1.

An endless-belt traction snow vehicle of this invention is wholly illustrated in FIG. 1. Said vehicle mainly consists of a vehicle body 1, an endless-belt traction means 2 for driving said vehicle body 1 and a pair of front skis 3 for directing the course.

As further detailed, said vehicle body 1 involves a frame 1a, a pair of foot steps 1b welded to or integrally formed with the sides of the frame 1a, a seat member 1c disposed on said frame 1a, and a front cover 1d disposed on the front portion of the frame 1a. Said endless-belt traction means 2 consists of a general-type driving mechanism which comprises an engine, a transmission device, sprocket wheels journaled to bearings mounted on the lower portion of the frame 1a, an endless-track belt of resinuous material such as a rubber or the like having serially arranged openings interlocked with the teeth of said sprocket wheels, and guide wheels journaled to other bearings mounted on the lower portion of the frame 1a, any one of said sprocket wheels being driven by said transmission device. In this embodiment, only said endless-track belt, sprocket wheels and guide wheels are indicated by the reference numerals 2a, 2b and 2c respectively.

Said front skis 3 are supported by vertically extensible leg members 4 at the front bottom of the vehicle body 1. Said leg members 4 are fixed by fitting means to the vehicle body 1 in a suitable length desired each time.

Namely, on the upper surface of each of said skis 3 are positioned supporting members 5 by which an arcuate superposed leaf spring 6 is attached to said ski at the ends. A channeled saddle 7 is attached to the middle portion of said spring 6 and rotatably connected with the lower end of the leg member 4 by means of a pin 8 of bolt-nut type. Said leg member 4 is formed into a round bar and slidably inserted into a hollow cylindrical supporting member 9 fixedly attached to the front portion of the vehicle body 1. At the upper end of said leg member 4 is integrally formed a screw 10 of a smaller diameter than that thereof. By screwing a nut 11 to the screw 10, an operating member 12 associated with a bar-shaped steering handle 12a is fixedly secured to the upper end of the leg member 4. Furthermore, said leg member 4 is upwardly urged by a coiled compressible spring 13 which is loosely wound around the leg member 4 and positioned between the upper end of the supporting member 9 and the operating member 12. At the side of the lower portion of the leg member 4 is mounted a stop member or abutment 14 such as a pin. A hollow cylindrical spacer 15 is rotatably fitted with the lower portion of the leg member 4 in in a manner to slide over the surface of the leg member in a lengthwise direction. Said spacer 15 has a flat peripheral surface formed at the upper end adjacent to the lower end of the supporting member 9, and a peripheral surface 15c undulated in the lengthwise direction of the leg member. Said undulated peripheral surface 15c has two or more recesses 15a and 15b to be selectively engaged with said pin 14. Said recesses 15a and 15b are arranged at different positions in the lengthwise direction of the leg member so that each of said recesses 15a and 15b acts to maintain a desired distance between the vehicle body 1 and said stop member or pin 14 against the urging action of the spring member 13 due to its engagement with said stop member 14. Said recesses 15a and 15b preferably assume the form of concave portions on the undulated peripheral surface 15c which is so formed as irregularly to undulate in part in the lengthwise direction of the cylindrical spacer 15. The stop member 14 is pressed to the bottom of either of the concave portions 15a and 15b by the spring action of the coiled spring member 13. A thrust washer 16 is preferably arranged between the supporting member 9 and spacer 15. Through this embodiment has a stop member and recesses corresponding to said stop member, the snow vehicle of this invention may be provided in practical design with two or more stop members of pin type equally spaced on the periphery of the leg member, and two or more groups of recesses corresponding to each of said stop members and disposed on the peripheral surface of the spacer, so as to cause the leg member to be sufficiently supported to the supporting member by the medium of the spacer.

In this invention, a combination of the spacer and stop member or members may assume any desired form so as to allow the leg member to be adjusted to the vehicle body stepwise or steplessly in relation to the lengthwise direction of said leg member.

Figure 3:
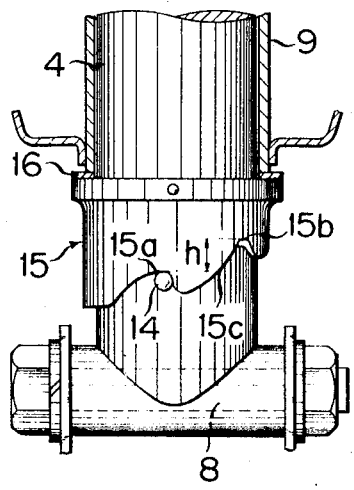
FIG. 3 is a rear side view of the said main part taken in a perpendicular direction to that of FIG. 2.

In operation, when the snow vehicle travels on the horizontal ground, said skis are previously set in place by engaging the stop member 14 with the spacer 15 at the bottom of the lower recess 15a as shown in FIG. 3 so as to receive suitable loads applied from the vehicle body, whereby said vehicle maintains the highest possible operability as well as a tolerable traction power. When the vehicle makes an ascent, the skis are previously set at a higher level than when it travels horizontally. Said setting is accomplished as follows. Namely, the supporting member 9, i.e., the front portion of the vehicle body 1 is first lifted against the resistance of the compression spring 13, so that the stop member 14 is released from pressed engagement with the spacer 15. Under this condition, a slight rotation of the spacer 15 shifts the first position of engagement with the lower recess 15a, as illustrated, to the second position of engagement with the upper recess 15b.

As a result, the leg member 4 is withdrawn into the vehicle body by a difference h in the distances from the upper flat surface of the spacer 15 to the bottoms of concave portions 15a and 15b, whereby the front skis 3 receive slightly smaller loads than when travelling on the horizontal ground. Accordingly, the vehicle can develop the highest possible traction power as well as a tolerable operability, even when it is under an ascending condition.

Though the embodiment disclosed herein relates to a snow vehicle having a pair of front skis, this invention may be applied to another vehicle having only one ski.

What I claim is:

1. An endless-belt traction snow vehicle comprising: a vehicle body; an endless-belt traction means driving said vehicle body; a ski or skis for directing the course; a vertically extensible leg member which corresponds to each of said skis and by which said ski is supported at the front bottom of the vehicle body; said vehicle body being provided with a hollow cylindrical supporting member disposed at the front portion thereof and corresponding to said leg member; said leg member being formed into a round bar slidably inserted into said supporting member; means for fixing said leg member to said vehicle body in a suitable length desired each time; and said fixing means consisting of a spring member for upwardly urging said leg member relative to said vehicle body, a spacer and a stop member or members combined with said spacer so as to allow the leg member to be adjusted to the vehicle body stepwise or steplessly in relation to the lengthwise direction of said leg member.

2. An endless-belt traction snow vehicle claimed in claim 1 in which an operation member associated with a steering handle is connected with the upper end of the leg member, and the spring member is formed into a compressible coil positioned between the upper end of said supporting member and said operating member.

3. An endless-belt traction snow vehicle claimed in claim 1 in which the stop member is of pin type.

4. An endless-belt traction snow vehicle claimed in claim 1 in which said spacer is provided with a flat peripheral surface formed at the upper end adjacent to the lower end of said supporting member, and a peripheral surface formed at the lower end and provided with a group or groups of recesses arranged at different positions in the lengthwise direction of the leg member, and said stop member corresponding to each group of the recesses is mounted on the periphery of the leg member below the spacer, each of the recesses acting to maintain a desired distance between the stop member and the adjacent portion of the supporting member to the spacer against the urging action of the spring member due to its engagement with the stop member.

5. An endless-belt traction snow vehicle claimed in claim 4 in which the stop member is of pin type.

6. An endless-belt traction snow vehicle claimed in claim 4 in which the lower peripheral surface of the spacer irregularly undulates in part in the lengthwise direction of the cylinder thereby to form a plurality of concave portions differently spaced from the upper peripheral surface for engagement with the stop member, said concave portions defining the recesses respectively.

7. A snow vehicle comprising a vehicle body, an endless-belt traction means supporting an operable to drive said vehicle body, a ski disposed forwardly of said endless-belt traction means for directing the course of travel of said vehicle body, an extensible leg member having a lower end attached to said ski, a hollow cylindrical supporting member fixed to said vehicle body and slidably receiving said leg member, a spring interposed between said leg member and said hollow cylindrical member urging said leg member upwardly, an abutment on one of said members, and steps on the other of said members to selectively support said abutment to effect step adjustment of said leg member.

8. A snow vehicle characterized substantially in accordance with claim 7, including a tubular spacer affixed onto the lower end of said hollow cylindrical supporting member, said spacer being provided with a flat peripheral surface formed at the upper end adjacent to the lower end of said hollow cylindrical supporting member, and a peripheral surface formed at the lower end and provided with a number of recesses arranged at different positions in the lengthwise direction of said leg member, and said abutment corresponding to each of said recesses is mounted on the periphery of said leg member below said spacer, each of said recesses acting to maintain a desired distance between said abutment and the adjacent portion of said hollow cylindrical supporting member to the spacer against the urging action of said spring due to its engagement with said abutment.